United States Patent [19]
Finnigan

[11] 3,957,282
[45] May 18, 1976

[54] ATTACHMENT FOR A VEHICLE SHOULDER HARNESS

[76] Inventor: Joseph C. Finnigan, 1204 Allendale Road, McLean, Va. 22101

[22] Filed: Dec. 5, 1974

[21] Appl. No.: 529,710

[52] U.S. Cl. .................................. 280/744; 224/5 P
[51] Int. Cl.² ......................................... B60R 21/00
[58] Field of Search.................. 280/150 SB, 150 B; 180/82 C; 224/5 P, 8 R, 26 R

[56] References Cited
UNITED STATES PATENTS

| | | | |
|---|---|---|---|
| 2,643,380 | 6/1953 | Blair................................ | 224/5 P X |
| 3,306,662 | 2/1967 | Finnigan.................... | 280/150 SB X |
| 3,713,694 | 1/1973 | Miller.......................... | 280/150 B X |
| 3,722,951 | 3/1973 | Ezquerra.................. | 280/150 SB X |

FOREIGN PATENTS OR APPLICATIONS

| | | | |
|---|---|---|---|
| 948,829 | 8/1949 | France............................. | 224/26 R |
| 521,222 | 5/1940 | United Kingdom................. | 224/5 P |
| 1,124,239 | 6/1956 | France......................... | 280/150 SB |

Primary Examiner—Robert R. Song
Assistant Examiner—Michael J. Forman
Attorney, Agent, or Firm—Barlow & Barlow

[57] ABSTRACT

An attachment for a shoulder harness comprising a soft resilient material embracing the shoulder belt and providing a cushioning surface which enlarges as pressure is applied to it in the vicinity of the neck of the wearer to blunt the edge of the belt as it is urged toward the neck of the wearer, the same being attachable and detachable from existing shoulder harnesses. The device also allows the wearer to enjoy increased comfort while wearing the device on the shoulder belt under normal driving conditions.

7 Claims, 8 Drawing Figures

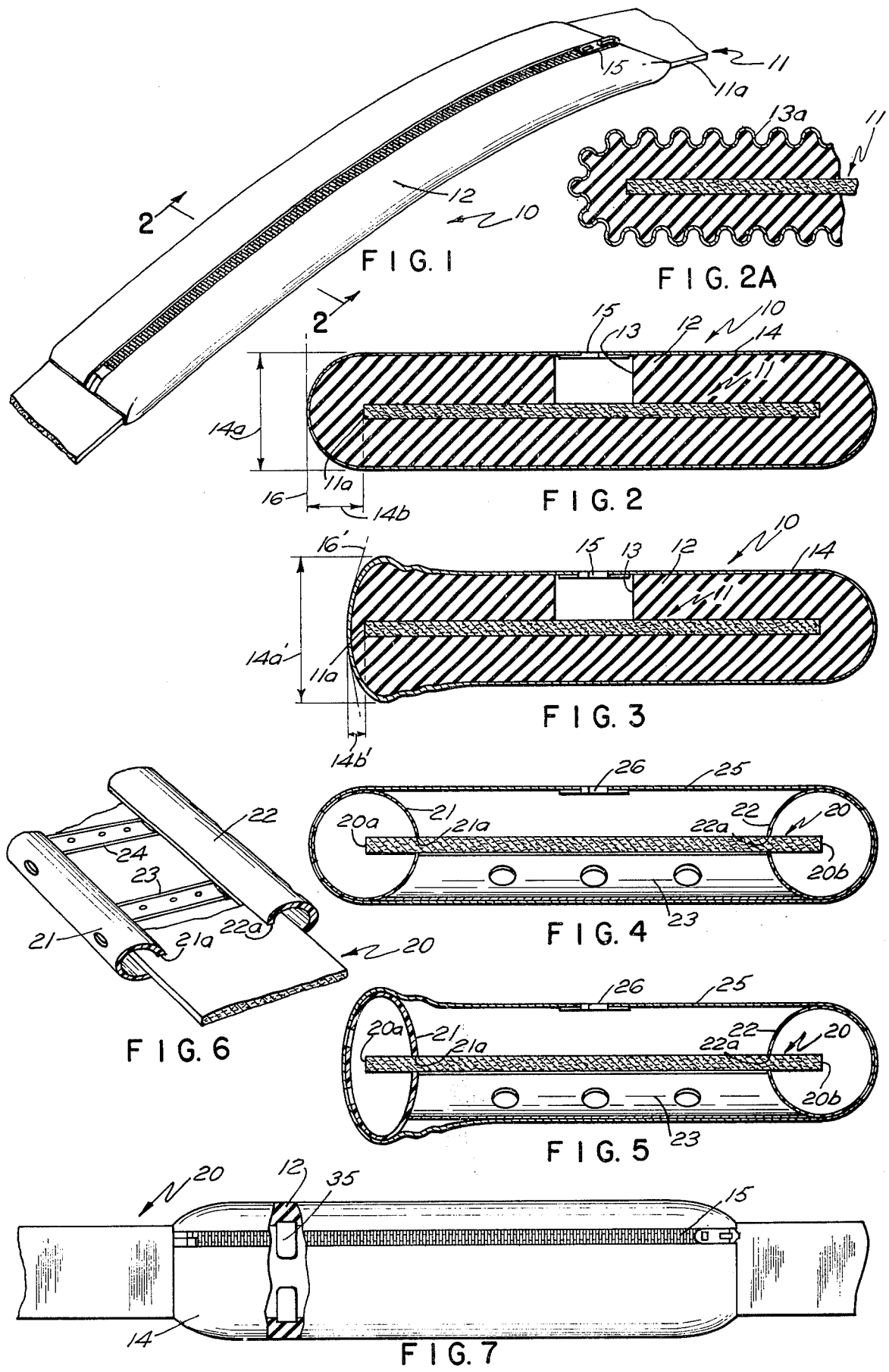

3,957,282

ATTACHMENT FOR A VEHICLE SHOULDER HARNESS

BACKGROUND OF THE INVENTION

At the present time shoulder harness belts are used by a very small number of drivers in spite of the fact that most cars are equipped with them, 1974 ignition interlocks notwithstanding. One of the main reasons for non-use lies in the position of the belt when in use and its construction. To be effective in all positions of the driver's seat, a shoulder belt must be attached to the car a substantial distance rearwardly of the driver's shoulder when the seat is in its rearmost position. The angle of the belt as it crosses the wearer's shoulder increases as the seat is moved forward. As the seat moves forward, the edge of the belt facing the neck of the wearer moves toward the neck of the wearer into contact either with the skin or clothing of the wearer. The hard coarse weave of the average belt results in its having a rough or serrated edge which either abrades the user's neck or his clothing. This constant rubbing and its effects can be very annoying and very often leads to disuse of the belt.

Furthermore, in case of an accident or sudden stop in which the user is thrown forwardly, tests have proven that considerable cosmetic injury can be caused to the user by the belt's edge. At times the serrated edge of the belt actually cuts into or severely abrades the neck of the wearer.

One of the first newspaper articles which mentioned the observation that "the upper torso safety belt may cause abrasions in the neck and shoulder area of the driver or passenger it protects" is quoted verbatim hereafter to provide some evidence of the authenticity of the problem and to review the time frame in which this problem became apparent to the automobile industry. THE WASHINGTON POST, Sunday, Aug. 20, 1967 "Doubt Cast on Shoulder Seat Belts By Robert W. Irvin Special to the Washington Post DETROIT, Aug. 19 — Crash tests indicate that in some cases the shoulder belts that will be required under the 1968 Federal auto safety standards may do more harm than good in an accident.

"The new information 'raises a question as to whether upper torso belts should be mandatory on 1968 motor vehicles,' the Federal Highway Administration said today."

"The officials are taking another look at the seat belt regulation because they are obviously worried by results of tests at the General Motors proving ground near Milford, Michigan."

"Films of the test were sent to Washington early this summer but the decision for a full review of the regulation was not made until recently after the results of tests on human volunteers at Holloman Air Force Base in New Mexico. The tests were conducted by the National Bureau of Standards."

"The tests indicated that in a 30 mph barrier crash 'the upper torso safety belt may cause abrasions in the neck and shoulder area of the driver or passenger it protects,' the Government said, but added that it 'did stop test participants from being smashed forward'. "

It could be summarily reasoned that with the mandatory factory installation of air bags in all new 1976 or 1977 automobiles and thereafter that shoulder belts and all of the problems associated with the wearing of shoulder belts will no longer be a major concern to the individual motorist or to the National Highway Traffic Safety Administration. However, by 1975 there will probably be 100 million automobiles registered in the United States within the 1967 to 1976 models that were required to be equipped with shoulder belts as original equipment.

SUMMARY OF THE INVENTION

This invention relates to an attachment for a vehicle shoulder harness belt of the type commonly used in automobiles. The attachment is detachably mounted on the shoulder belt and covers it so that the belt is prevented from contacting either the clothes or the skin of the user. Because the attachment has a resilient body, the edge facing the user's neck flattens when pressed into engagement with the wearer. This distributes the effect of the force over a wide area reducing cosmetic injuries to a minimum. The resilient body also provides increased comfort to the wearer under normal driving conditions. This resiliency when combined with increased surface area, smoothly rounded edges, and a soft fabric cover provide for increased normal driving comfort.

DESCRIPTION OF THE DRAWINGS

FIG. 1 is a perspective view of a shoulder harness belt with my attachment mounted on it;

FIG. 2 is a vertical cross section taken on line 2—2 of FIG. 1;

FIG. 2A is similar to FIG. 2 showing a modification of the resilient material;

FIG. 3 is a diagrammatic view of the embodiment shown in FIG. 1 illustrating the action of the attachment when pressed into engagement with the neck of the wearer;

FIG. 4 is a vertical section similar to FIG. 2 but of another embodiment of my invention;

FIG. 5 is a diagrammatic view of the embodiment shown in FIG. 4 illustrating the action of the attachment when pressed into engagement with the neck of the wearer;

FIG. 6 is a perspective view of a portion of the embodiment shown in FIG. 4; and FIG. 7 is a plan view of a modified model of the attachment shown in FIG. 1.

DESCRIPTION OF THE PREFERRED EMBODIMENT

As is best shown in FIG. 1, the attachment generally indicated at 10, in use is mounted on and extends longitudinally of a shoulder belt, generally indicated at 11. It comprises a body section 12 (FIG. 2) made of a soft, resilient, non-inflammable foam material. It is significant that this material encases belt 11 not merely held to the underside of the belt and is provided with a slot 13 extending longitudinally of the attachment 10. This slot allows the invention to be opened lengthwise when being mounted on or removed from the belt.

The foam body section 12 of the attachment is covered by a casing 14 made of a soft cloth-like material. Casing 14 may either be formed integrally with or attached to body section 12 so that when the attachment is removed from the belt, the foam body section and the casing form an integral unit. Casing 14 is slit longitudinally in alignment with slot 13, the slit being closed by a zipper 15 or other suitable closure means. Zipper 15 holds the attachment in mounted position on belt 11 and permits it to be quickly mounted on or detached from the belt. Thus the attachment may be readily positioned on the belt so that it is correctly positioned with respect to the neck of the user. Because of the resilient foam material of which body section 12 is formed, closing zipper 15 presses the body section 12 into engagement with the belt 11 and frictionally prevents the attachment from moving longitudinally of the belt. Thus, once correctly positioned on belt 11, the attachment maintains its position regardless of movements of the body of the user. Soft plastic or rubber clips may be suitably attached by sewing to the foam as shown at 35 in FIG. 7 to keep the attachment laterally aligned on the belt.

As pointed out above, seat belts are usually made of a strong, durable fiber such as nylon and the weave in most instances is coarse. The belt's serrated edge facing the neck of the user is a constant annoyance as it is either rubbing their neck or abrading their clothes. Referring to FIGS. 1 and 2, it should be noted that the outer surfaces of the portions of attachment 10 covering the edges of belt 11 are semi-circular in cross section. This prevents direct contact between the edge of the shoulder belt 11a and the user and presents a wide surface to the user so that the shoulder belt does not abrade the neck or clothing of the user in the manner of the serrated edges of belt 11. With regard to the objective of the embodiment to provide comfort, a certain amount of increased cooling can be facilitated during the manufacturing of the foam to mold one side of the foam surface in a corrugated shape as in 13a of FIG. 2A. This allows for increased air circulation under the attachment which is resting on the shoulder area.

When a person wearing a shoulder belt is thrown forward, one of the serrated edges of the belt may be driven into the user's neck. As pointed out above, this can cause cosmetic injuries which at times have been serious. Referring to FIGS. 2 and 3 the line 16 is used to diagrammatically illustrate the surface of the neck of the wearer. In normal use the edge of the attachment is positioned adjacent the neck of the wearer and moves into and out of contact with the wearer's neck or clothes as the wearer moves.

On impact the belt and the attachment move toward the neck of the wearer. On impact the attachment's contacting edge (FIG. 2) flattens so that its neck engaging surface 14a is greatly expanded to 14a' and thus the force is spread over an extremely wide neck surface area. Additionally, the thickness of foam between the edge of the belt and the neck of the wearer 14b is compressed during impact to 14b' and absorbs some of the penetrating force of the belt edge as shown. Because of this combination of beneficial effects and because casing 14 is made of a soft material, there is minimal abrading effect on the neck of the user. Thus, the significance of the foam material substantially encasing the belts is illustrated.

Referring to FIGS. 4 and 6 in which another embodiment of my invention is shown, the usual shoulder harness belt is generally indicated at 20. The edges 20a and 20b of the belt are enclosed in tubular guard sections 21 and 22 made of resilient neoprene or a material having similar characteristics. Sections 21 and 22 are split longitudinally by slots 21a and 22a which extend longitudinally of an attachment similar to that shown in FIG. 1. A series of arcuate shaped spacers similar to that shown at 23 and 24 (FIGS. 4 and 6) are provided to hold tubular sections 21 and 22 in spaced relation with respect to each other with the edges 20a and 20b of belt 20 (FIG 4) spaced from the outer portions of sections 21 and 22. The ends of the spacers, such as spacers 23 and 24, are bonded to tubular sections 21 and 22 in any suitable manner beneath guard section slots 21a and 22a or the entire matrix may be molded in one piece. Thus the tubular sections 21 and 22 and the arcuate spacers form an integral unit or body section for this attachment.

The spacers and guard sections 21 and 22 are covered with a casing 25 made of a porous, soft, flexible material. This material is bonded or attached to guard sections 21 and 22 in any suitable manner and is provided with a zipper 26 or other closure means extending longitudinally of the attachment in a manner similar to the zipper 15 in FIG. 1. This zipper permits the attachment to be opened lengthwise so that it may be flexed into an open position and mounted on belt 20. When the zipper is closed the guard sections act thru their slots to grip belt 20 and thus secure the attachment to belt 20 to prevent it from moving out of correct position with respect to the neck of the user.

All of the spacers such as spacers 23 and 24 and guard sections 21 and 22 are perforated. Because casing 25 is porous, air is thus permitted to circulate thru the interior of the attachment and sections 21 and 22. This flow of air thru the attachment is highly desirable and greatly increases the comfort of the wearer especially in automobiles that are not air conditioned.

In every day use this attachment acts similarly to the embodiment shown in FIGS. 1 and 2 in that it protects the user from the abrading effect of the serrated edge of the normal shoulder belt. When on impact the edge of belt 20 is moved toward the neck of the user, the flexible tubular guard section forced into the neck of the user flattens and thus spreads the force over a very large area on the neck of the user as shown in FIG. 5. The soft casing 25 and the enclosed tubing prevents the shoulder belt from having an abrading effect by both preventing direct contact of the belt with the neck and increasing the impacting area.

FIG. 7 illustrates another example of an embodiment of the invention with the zipper or closing device offset from the center line of the belt toward the edge of the belt which will be positioned away from the neck region when the invention is being properly worn. The principal reason for the offset closing device includes providing a continuous uninterrupted area for an emblem or design.

From the foregoing it will now be seen that there is herein provided an improved attachment for shoulder belts or seat belts which accomplishes all of the objects of this invention and others, including many advantages of great practical utility and commercial importance.

As many possible embodiments may be made of this inventive concept, and as many modifications may be made in the embodiments herein before shown and described, it is to be understood that all matter herein is to be interpreted merely as illustrative and not in a limiting sense.

I claim:

1. A detachable safety device for a motor vehicle that is equipped with a belt of substantial width having opposite edges comprising an attachment for covering the belt adjacent the neck of the user, said covering comprising a unit having a collapsible resilient material of a width substantially greater than the width of the belt and of a thickness greater than the thickness of the belt and folded across and about the edge of the belt and overlapping the opposite side nearest the neck of the user to provide a bight of resilient material about the edge and a covering for said material laterally encircling the belt and provided with a separable closure extending lengthwise of the belt whereby upon a lateral shifting of the belt the bight of the resilient material about the belt edge may spread to a thickness a multiple of the belt thickness to provide a substantial width for enlarging the area of contact and cushioning the impact of the belt edge with the user.

2. A detachable safety device attachment as in claim 1 wherein the unit frictionally engages the belt under sufficient pressure due to the resilient material to prevent longitudinal sliding of the unit on the belt.

3. A detachable safety device attachment as in claim 1 wherein the resilient material is solid sponge-like rubber-like material.

4. A detachable safety device attachment as in claim 1 wherein the resilient material essentially surrounds the shoulder belt.

5. A detachable safety device attachment as in claim 1 wherein the resilient material is molded to form corrugated channels in the material for the purpose of allowing increased air flow under and around the device.

6. A detachable safety device for a motor vehicle that is equipped with a belt of substantial width having opposite edges comprising an attachment for covering the belt adjacent the neck of the user, said covering comprising a unit having a collapsible resilient material embracing the edge of the belt nearest the neck of the user, said resilient material being of hollow tubular form slit lengthwise and receiving therein the edge of the belt, and a covering for said material laterally encircling the belt and provided with a separable closure extending lengthwise of the belt.

7. A detachable safety device attachment as in claim 6 wherein means extend between the tubular material on the opposite edges to prevent lateral collapsing of the belt.

* * * * *